US006334104B1

(12) United States Patent
Hirai

(10) Patent No.: US 6,334,104 B1
(45) Date of Patent: Dec. 25, 2001

(54) SOUND EFFECTS AFFIXING SYSTEM AND SOUND EFFECTS AFFIXING METHOD

(75) Inventor: Sanae Hirai, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/389,494

(22) Filed: Sep. 3, 1999

(30) Foreign Application Priority Data

Sep. 4, 1998 (JP) ........................................ 10-250264

(51) Int. Cl.[7] .......................... G10L 13/04; G10L 13/08; G10L 21/00; A63F 13/00

(52) U.S. Cl. .......................... 704/258; 704/260; 704/270; 704/272; 704/275; 704/278; 463/40

(58) Field of Search .................................. 704/1, 9, 235, 704/270, 260, 243, 221, 258, 257, 272, 275, 278

(56) References Cited

U.S. PATENT DOCUMENTS 4,375,058 * 2/1983 Bouma et al. ....................... 704/258
5,208,863 * 5/1993 Sakurai et al. ....................... 704/221
5,799,267 * 8/1998 Siegel ....................................... 704/1
6,188,977 * 2/2001 Hirota ....................................... 704/9

FOREIGN PATENT DOCUMENTS 2343821 5/2000 (GB) .
5-333891 12/1993 (JP) .
6-208394 7/1994 (JP) .
6-79228 10/1994 (JP) .
6-337876 12/1994 (JP) .
7-72888 3/1995 (JP) .
7-200554 8/1995 (JP) .
10-149365 6/1998 (JP) .
12-081892 * 3/2000 (JP) .............................. G10L/13/04

OTHER PUBLICATIONS

TextAssist™ (“Users Guide,” Creative Labs, © 1993).*
Wake et al.; “An Intuitive Retrieval and Editing System for Sound Data”; Information Processing Society; vol. 29, No. 2; Jan. 1997; pp. 7–12.
Hiroshi et al.; “Automatic Reading Device”; Patent Abstracts of Japan; Publication No. 05333891; Publication Date: Dec. 17, 1993; Abstract.

* cited by examiner

*Primary Examiner*—Richemond Dorvil
*Assistant Examiner*—Daniel A Nolan
(74) *Attorney, Agent, or Firm*—Foley & Lardner

(57) ABSTRACT

A sound effects affixing device which enables sound effects and background music to be affixed in relation to inputted sentences automatically. A keyword extraction device is provided with a onomatopoeias extraction measure, a sound source extraction measure, and a subjective words extraction measure, which measures extract keyword of the onomatopoeias, the sound source names, or the subjective words within inputted sentences. A sound retrieval device selects sound effects and music by these keywords, thus selected sound effects and music are outputted by an output sound control device synchronized with synthesized speech.

24 Claims, 12 Drawing Sheets

FIG. 3
PRIOR ART

1120 ENVIRONMENT TABLE

| ENVIRONMENT NAME (1200) | VERB (1210) | INDEX OF SOUND (1220) |
|---|---|---|
| RAIN | FALL | nature1 |
| WIND | BLOW | nature2 (1230) |
| WAVE | RUN HIGH, BECOME STORMY | nature3 |
| VEHICLE | RUN, COLLIDE WITH | vehicle1 |
| PLANE | FLY, LAND | vehicle2 |
| DOG | BARK | life1 |
| CAT | MEOW | life2 |

FIG. 8

| SENTENCE NUMBER COLUMN (121) | SENTENCE COLUMN (122) | SOUND INDEX COLUMN (123) |
|---|---|---|
| 1 | TODAY, WHEN I RODE ON A BICYCLE, SUDDENLY, A CRY OF WHINE WAS HEARD. | Dog. wav |
| 2 | WHEN I LOOKED AROUND, A DOG IS PURSUED BY A CAT. | |
| 3 | I REPELLED THE CAT WHILE BEATING AN OIL DRUM LYING IN NEAR SIDE. | Can. wav |
| ---- | ------------------------ | ---------- |
| N | SINCE, I HEARD SHARP METALLIC SOUND, I TURNED AROUND, IN THAT PLACE------- | Effect 1. wav |

FIG. 9

| | | |
|---|---|---|
| TEXT NUMBER | Dog, wav | |
| TITLE | DONE | |
| ONOMATOPOEIAS | KYAEEN, KYUEEN, KYAN, KUUN, YELP | |
| SOUND SOURCE NAME | DOG | |
| POINT OF SUBJECTIVE WORD | ANNOYING ----5.00<br>METALLIC ----0.00<br>THICK ----1.67<br>BEAUTIFUL ----0<br>UNSATISFACTORY----0 | MAGNIFICENT ----0.00<br>HARD ----3.33<br>CHEERFUL ----1.67<br>DULL ----1.67<br>MILD ----0 |

SOUND EFFECTS AFFIXING SYSTEM AND SOUND EFFECTS AFFIXING METHOD

BACKGROUND OF THE INVENTION

The present invention relates to a sound effects affixing system. More to particularly, this invention relates to a sound effects affixing system and a sound effects affixing method for affixing sound effects automatically to a text document.

DESCRIPTION OF THE PRIOR ART

Formerly, this kind of system for affixing sound effect to the text reading is utilized for the purpose of provision of presence to the reading speech. As the conventional system of this kind, for instance, the Japanese Patent Application Laid-Open No. HEI 7-72888 discloses an information processing device which enables speech output to which the sound effects are affixed by extracting environment of the scene using natural language processing. FIG. 1 is a view showing a constitution of the information processing device proposed therein. Referring to FIG. 1, the information processing device comprises a key board 1010 for inputting a sentences, a document input unit 1020, a memory 1030 for storing therein the inputted sentences, a natural language processing unit 1040 for analyzing the sentences, a characters characteristic extraction unit 1060 for extracting characteristic of the characters who appear in the inputted sentences, a speech synthesizing unit 1090 for synthesizing speech using characteristic of the characters, an environment extraction unit 1050 for extracting environment described in the sentences from the sentences, a sound effects generation unit 1070 for generating the sound effects from the extracted environment, and a sound output unit 1080 mixing synthesizing synthesized speech with the sound effects to output sound with some effect processing (reverb, echo, and so on).

FIG. 2 is a view showing a constitution of the environment extraction unit 1050. Referring to FIG. 2, the environment extraction unit 1050 consists of an environment extracting section 1110 and an environment table 1120.

FIG. 3 is a view showing one example of the environment table 1120.

Next, there is described about a part concerning sound effects affixing referring to FIGS. 1, 2, and 3.

The sentences inputted from the key board 1010, or the document input unit 1020 are accumulated in the memory 1030 as the text data. The natural language processing unit 1040 implements a morpheme analysis and a construction analysis to analyze natural language in relation to accumulated sentences in the memory 1030.

On the other hand, the environment extraction unit 1050 extracts environment from result of analysis of the text outputted from the natural language processing unit 1040.

In the case of extraction of the environment, firstly, the environment extraction unit 1050 extracts pair of the subject and verb from the text to query the index of sound to the environment table 1121 shown in FIG. 3. For instance, when it is obtained that:

a subject: wind a verb: blow from a part of "The wind blows at the top of the hill", the environment extraction unit 1050 outputs an index "natural 2" 1230 of the corresponding sound effects based on referring to the environment table 1120 (FIG. 3).

Thus the information processing device inputs the obtained index of the sound 1230 to the sound effects generation unit 1070 to generate the sound effects whose index is obtained, before inputting to the sound output unit 1080.

However, in the above described information processing device, although it is capable of affixing the sound effects, there exists also following problems:

The first problem is that the processing of the sound effects affixing is complicated, so that time of processing and retrieval becomes long.

The reason is that the information processing device is implementing the natural language processing in relation to the whole sentences.

The second problem is that it does not make the use of the onomatopoeias as being the concrete representation of the sound.

The reason is that the information processing device is implementing the processing which pays attention to only the subject and verb of the sentences.

The third problem is that it is incapable of being affixed the background music to the sentences.

The reason is that it is the same reason as that of the second problem.

SUMMARY OF THE INVENTION

In view of the foregoing, it is an object of the present invention, in order to overcome the above mentioned problems, to provide a sound effects affixing system and a sound effects affixing method which is capable of being processed in a short time.

It is another object of the present invention, to provide a sound effects affixing system and a sound effects affixing method for affixing sound effects faithfully to sound representation within the text document.

It is still another object of the present invention, to provide a background music affixing device for affixing background music automatically.

There will be described outline of the present invention. The present invention acquires onomatopoeias, sound source names, and subjective words of sentences in order to select sound effects corresponding thereto.

Here, the subjective word is defined that the subjective word means a word (for instance, Mild, Sharp, Metallic, and so forth) such as an adjective and so forth utilized by describing the sound.

More concretely, the device of the present invention comprises a keyword extraction means for acquiring the onomatopoeias, the sound source names, and the subjective words from the sentences and a sound retrieval means for retrieving the sound effects using these keywords.

Further, the present invention selects background music from a music database in answer to number of appearance of the subjective words appears in the sentences. More concretely, the device of the present invention comprises a keyword extraction means for acquiring the subjective words from the sentences, a keyword counting means for counting the subjective word appears in the sentences, and a sound retrieval means for retrieving music data according to the subjective words.

In the description of the sound, there is characteristic to be utilized onomatopoeias, sound source names, and subjective words frequently, therefore, the keyword extraction means acquires these kinds of keywords from the sentences.

The sound retrieval means selects the sound effects corresponding to the sentences by retrieving the sound effects data using obtained keywords.

Further, when music is affixing to the sentences, the keyword extraction means acquires only subjective words as keywords from the sentences.

The keyword counting means counts the number of each subjective words obtained. When the count number exceeds the threshold value, the sound retrieval means retrieves the music according to this subjective word because it can be regarded the tendency of the sentences is like the subjective word represents.

According to a first aspect of the present invention, in order to achieve the above-mentioned objects, there is provided a sound effects affixing method which comprises steps of a step for acquiring a sentences in every prescribed unit from inputted text data, a step for extracting at least one kind in onomatopoeias, sound source names, and subjective words within said sentences, a step for retrieving corresponding sound effects from sound database with any of extracted the onomatopoeias, the sound source names, and the subjective words, and a step for outputting synthesized speech for reading said sentences synchronized with retrieved sound effects corresponding to one of the onomatopoeias, the sound source names, and the subjective words.

According to a second aspect of the present invention, in the first aspect, there is provided a sound effects affixing method, wherein the prescribed unit is any of a passage, a sentence, or a paragraph.

According to a third aspect of the present invention, there is provided a sound effects affixing device which comprises a text acquisition means for acquiring a sentences in every prescribed unit from an inputted text data, an onomatopoeias extraction means for extracting onomatopoeias within the sentences while inputting the sentences acquired by the text acquisition means, a sound retrieval means for retrieving a sound database using the onomatopoeias extracted by the onomatopoeias extraction means, and an output sound control means for outputting synthesized speech for reading the sentences from the text acquisition means synchronized with sound effects corresponding to the onomatopoeias retrieved by the sound retrieval means.

According to a fourth aspect of the present invention, there is provided a sound effects affixing device which comprises a text acquisition means for acquiring a sentences in every prescribed unit from an inputted text data, a sound source extraction means for extracting sound source names within the sentences while inputting the sentences acquired by the text acquisition means, a sound retrieval means for retrieving a sound database using the sound source names extracted by the sound source extraction means, and an output sound control means for outputting synthesized speech for reading the sentences from the text acquisition means synchronized with sound effects corresponding to the sound source names retrieved by the sound retrieval means.

According to a fifth aspect of the present invention, there is provided a sound effects affixing device which comprises a text acquisition means for acquiring a sentences in every prescribed unit from an inputted text data, a subjective words extraction means for extracting subjective words in the sentences while inputting the sentences acquired by the text acquisition means, a sound retrieval means for retrieving a sound database using the subjective words extracted by the subjective words extraction means, and an output sound control means for outputting synthesized speech for reading the inputted sentences synchronized with sound effects corresponding to the subjective words retrieved by the sound retrieval means.

According to a sixth aspect of the present invention, there is provided a background music affixing device which comprises a text acquisition means for acquiring a sentences in every prescribed unit from an inputted text data, a subjective words extraction means for extracting subjective words in the sentences while inputting the sentences acquired by the text acquisition means, a keyword counting means for counting number of each subjective word extracted by the subjective words extraction means, a sound retrieval means for retrieving a music database using subjective words outputted from the keyword counting means, and an output sound control means for outputting synthesized speech for reading the sentences from the text acquisition means synchronized with music corresponding to the subjective words retrieved by the sound retrieval means.

According to a seventh aspect of the present invention, in the third aspect, there is provided a sound effects affixing device, wherein the onomatopoeias extraction means extracts “katakana”: the square form of kana existing in the sentences as a candidate of the onomatopoeias.

According to an eighth aspect of the present invention, in the fourth aspect, there is provided a sound effects affixing device, wherein the sound source extraction means extracts the sentences which includes verbs concerning sound registered beforehand is extracted, before implementing natural language processing in relation to the sentences extracted to extract sound source names.

According to a ninth aspect of the present invention, in the fifth aspect, there is provided a sound effect affixing device, wherein the subjective words are extracted from the sentences which includes both of the subjective words registered beforehand and nouns representing sound registered beforehand.

According to a tenth aspect of the present invention, in any of the third to the fifth aspects, there is provided a sound effects affixing device, wherein the prescribed unit acquired from the text data by the text acquisition means is any of a phrase, a sentence, or a paragraph.

According to an eleventh aspect of the present invention, in the sixth aspect, there is provided a background music affixing device, wherein the prescribed unit acquired from the text data by the text acquisition means is any of a phrase, a sentence, or a paragraph.

According to a twelfth aspect of the present invention, in any of the third to the tenth aspect, there is provided a sound effects affixing device, wherein sound effect data and at least one kind of keyword of onomatopoeias, sound source names, or subjective words as information labels concerning each sound effects data are registered in the sound database.

According to a thirteenth aspect of the present invention, in the sixth aspect, there is provided a background music affixing device, wherein the number of the same keyword of inputted keywords is counted, thus a keyword whose count number exceeds a threshold value established beforehand is outputted.

According to a fourteenth aspect of the present invention, there is provided a storage medium stored therein a program in order to realize sound effects affixing function by executing following respective processing by a computer, said program comprising the processing of processing for acquiring a sentences in every prescribed unit from inputted text data, processing for extracting at least one kind in onomatopoeias, sound source names, and subjective words within the sentences, processing for retrieving corresponding sound effects from sound database with any of extracted the onomatopoeias, the sound source names, and the subjective words, and processing for outputting synthesized speech for reading the sentences synchronized with retrieved sound effects corresponding to one of the onomatopoeias, the sound source names, and the subjective words.

According to a fifteenth aspect of the present invention, there is provided a sound effect affixing device which comprises a first storage means for maintaining a text data to be an object of sound effects affixing, a second storage means having sound added text table for storing to be maintained information of selected sound effects associated with sentences, a sound effects database to which sound effects data and at least one kind of keyword of onomatopoeias, sound source names, and subjective words as information labels concerning each sound effect data, a text acquisition means for copying acquired sentences to the sound added text table while acquiring sentences in every prescribed unit such as a passage, a sentence, a paragraph and so forth from text data stored in the first storage means, the sound effects affixing device further comprises a keyword extraction means provided with at least one means of a onomatopoeias extraction means for extracting the onomatopoeias while inputting acquired sentences by the text acquisition means, a sound source extraction means for extracting sound source names from the sentences which is relevant to the sound, while inputting the acquired sentences by the text acquisition means, a subjective words extraction means for extracting the subjective words from the sentences while inputting the acquired sentences by the text acquisition means, the sound effects affixing device further comprises a sound retrieval means retrieving sound effects database using at least one kind of the onomatopoeias, the sound source names, and the subjective words from the keyword extraction means as a keyword, thus writing index information of the sound of the retrieval result into the sound added text table associated with the sentences and words and phrases to be objects of sound effects affixing, the sound effects affixing device further comprises an output sound control means provided with a speech synthesizing means, a control means acquiring sentences in every prescribed unit from the sound added text table, before supplying for the speech synthesizing means, thus acquiring index of the sound corresponding to the sentences of the prescribed unit from the sound added text table, a sound effects output means inputting index acquired by the control mean to retrieve sound file of the index from the sound effects data base, thus acquiring sound effects data, and a sound output means, wherein the sound output means outputs synthesized speech outputted from the speech synthesizing means of the output sound control means synchronized with the sound effects data outputted from the sound effects output means.

The above and further objects and novel features of the invention will be more fully understood from the following detailed description when the same is read in connection with accompanying drawings. It should be expressly understood, however, that the drawings are for purpose of illustration only and are not intended as a definition of the limits of the invention.

BRIEF DESCRIPTION OF THE DRAWINGS

FIG. 3 is a view showing one example of an environment table in the conventional sound effects affixing device;

FIG. 8 is a view showing one example of sound added text table for explaining the configuration of one enforcement of the sound effects affixing device of the present invention;

FIG. 9 is a view showing one example of label of sound effect database for explaining the configuration of one enforcement of the sound effects affixing device of the present invention;

DETAILED DESCRIPTION OF THE PREFERRED EMBODIMENT

A preferred configuration of enforcement of the present invention will be described in detail in accordance with the accompanying drawings.

Figure 1:
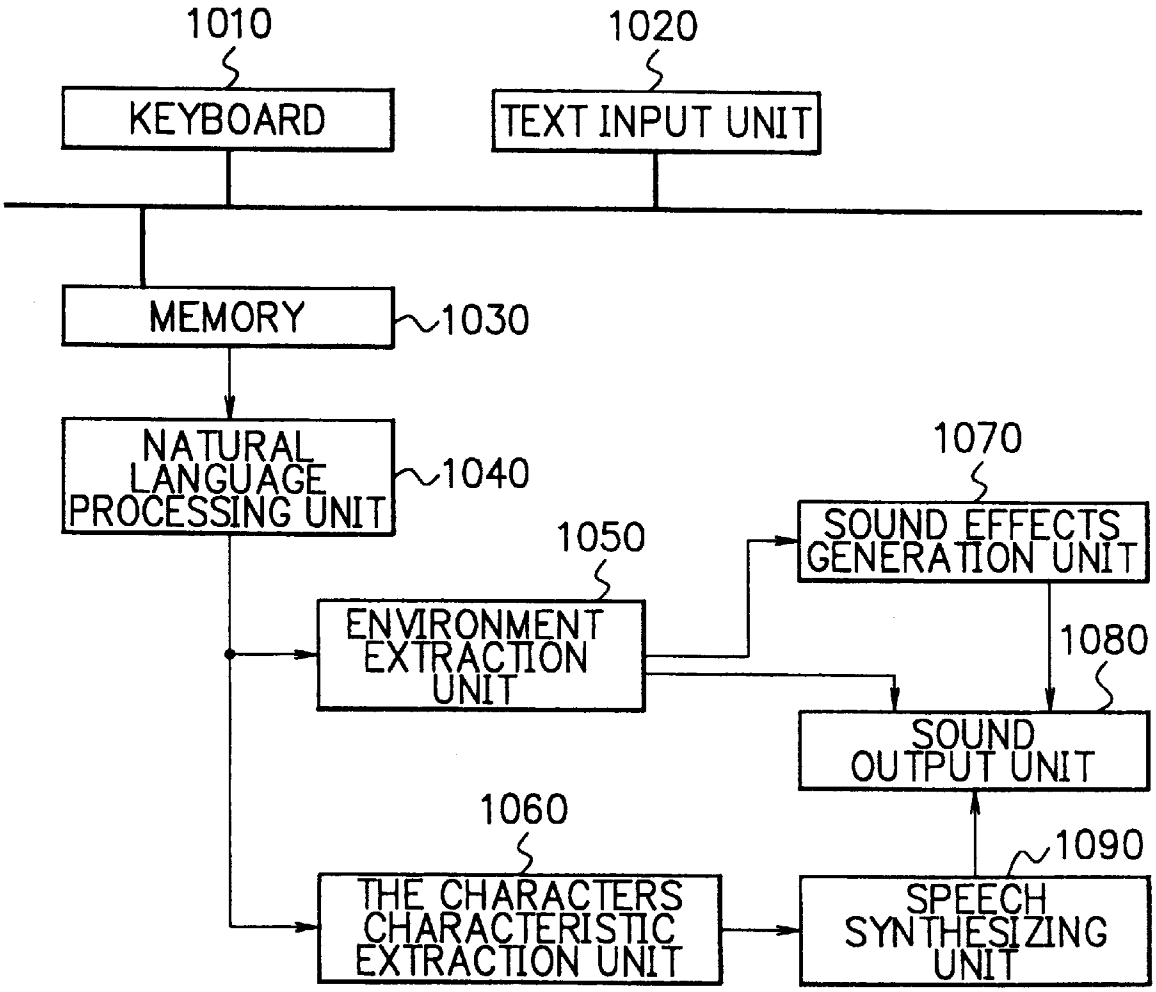
F I G. 1 PRIOR ART
FIG. 1 is a view showing a constitution of a conventional sound effects affixing device (information processor)
Figure 2:
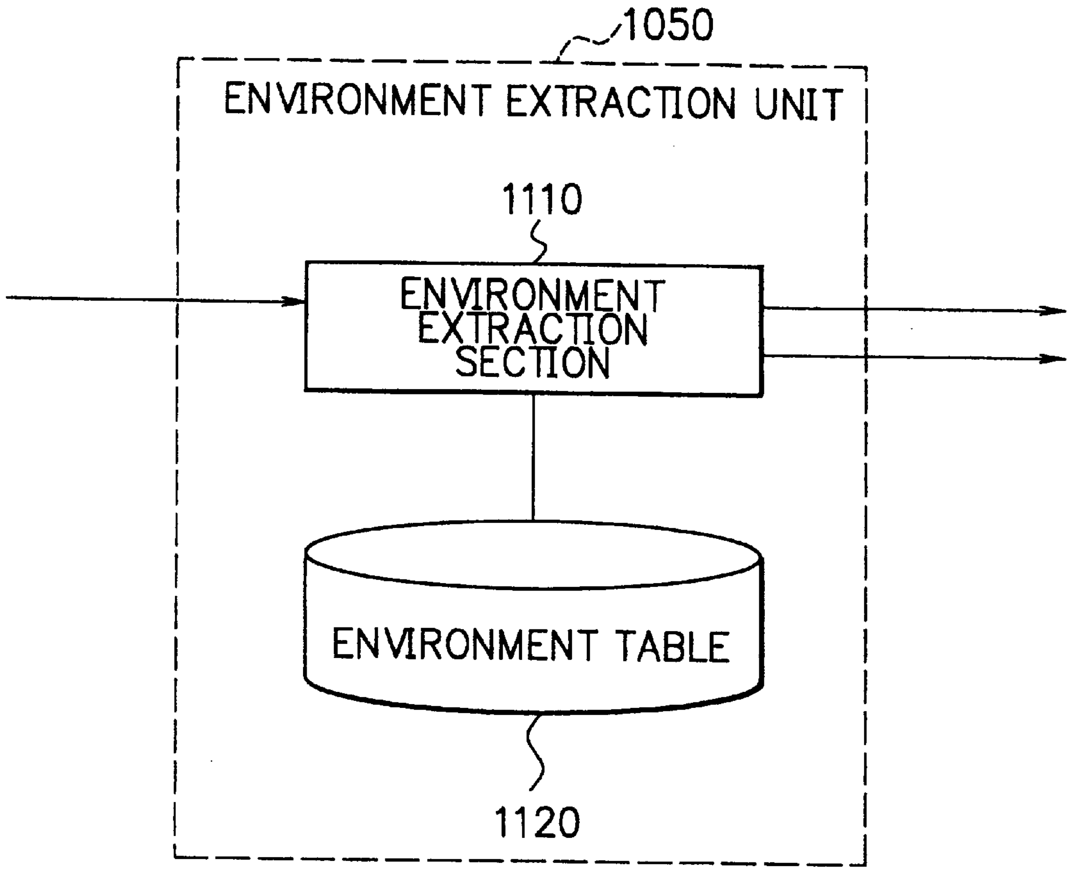
FIG. 2 PRIOR ART
FIG. 2 is a view showing a constitution of an environment extraction device in the conventional sound effects affixing device.
Figure 4:
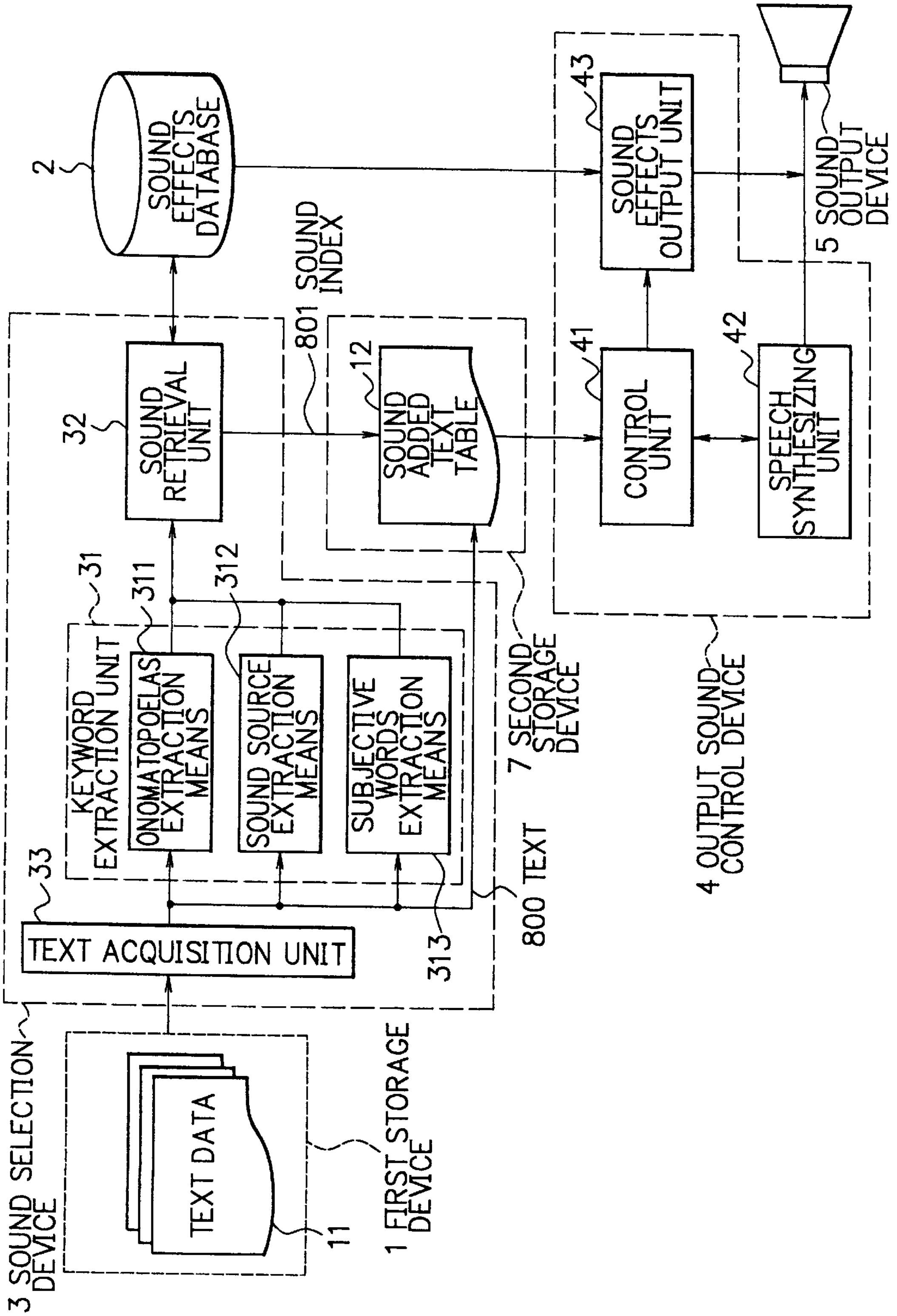
FIG. 4 is a view showing a constitution of configuration of one enforcement of sound effects affixing device of the present invention.

FIG. 4 is a block diagram showing a constitution of the first configuration of the enforcement of the present invention. Referring to FIG. 4, the first configuration of the enforcement of the present invention comprises a first storage device 1 stored therein a text data, a second storage device 7, a sound effects database 2, a sound selection device 3 for selecting the sound effects from the sound effects database, an output sound control device 4 for controlling output timing between synthesized speech and sound effects, a sound output device 5 for outputting sound.

The first storage device 1 stores therein a text data 11 to be a subject of a sound effects affix. The second storage device 7 stores therein a sound added text table 12 which stores to be maintained the information of the selected sound effects with the text.

In the sound effects database 2, there is accumulated the sound effects data and information label regarding the data. The information label includes at least one kind of keyword of "onomatopoeia", "sound source name" and "subjective word" which is adjective and/or adverb.

The sound selecting device 3 is provided with a text acquisition unit 33, a keyword extraction unit 31, and a sound retrieval unit 32.

The text acquisition unit 33 acquires sentences in every certain unit, for instance, in every passage, sentence or paragraph from the text data 11 stored in the first storage device 1, thus copying acquired sentences to the sound added text table 12. Further the text acquisition unit 33 outputs the acquired sentences to an onomatopoeia extraction means 311 of the keyword extraction unit 31, the sound source extraction means 312 and the subjective words extraction means 313.

The keyword extraction unit 31 is provided with at least one of the onomatopoeia extraction means 311, the sound source extraction means 312, and the subjective word extraction means 313, or which is provided with the whole means 311 to 313.

The onomatopoeia extraction means 311 inputs therein the sentences (text data) outputted from the text acquisition unit 33, before retrieving the onomatopoeia from the sentences, thus outputting the onomatopoeia retrieved to the sound retrieval unit 32.

The sound source extraction means 312 inputs therein the sentences (text data) provided from the text acquisition unit 33, before retrieving name of sound source from the sentences concerning the sound in the sentences, thus outputting the name of the sound source retrieved to the sound retrieval unit 32.

The subjective words extraction means 313 inputs therein the sentences (text data) provided from the text acquisition unit 33, before retrieving subjective words specified beforehand from the sentences, thus outputting the subjective words retrieved to the sound retrieval unit 32.

The sound retrieval unit 32 retrieves the sound effects database 2 according to the keyword inputted, thus writing an index (for instance name of file) of the sound of the retrieval result to the sound added text table 12. At this time, the index of the sound retrieved is included in the sound added text table 12 while associating with sentences to be the subject of the sound effects affixing.

The output sound control device 4 is provided with a control unit 41, a speech synthesizing unit 42, and a sound effects output unit 43.

The control unit 41 acquires the text in every unit from the sound added text table 12 to provide for the speech synthesizing unit 42.

Further, the controller 41 acquires sound index corresponding to sentences of prescribed unit from the sound added text table 12 to provide for the sound effects output unit 43.

The sound effects output unit 43 inputs therein an sound index from the control unit 41, before retrieving the sound file of the index from the sound effects database 2 to acquire the sound effect data (sound wave data).

Both of a synthesized speech outputted from the speech synthesizing unit 42 and the sound effects data outputted from the sound effects output unit 43 are outputted from the sound output device 5 consisting of a D/A converter and a speaker and so forth.

Next, there will be described operation of a configuration of the first enforcement of the present invention referring to FIGS. 4, 5, and 6.

Figure 5:
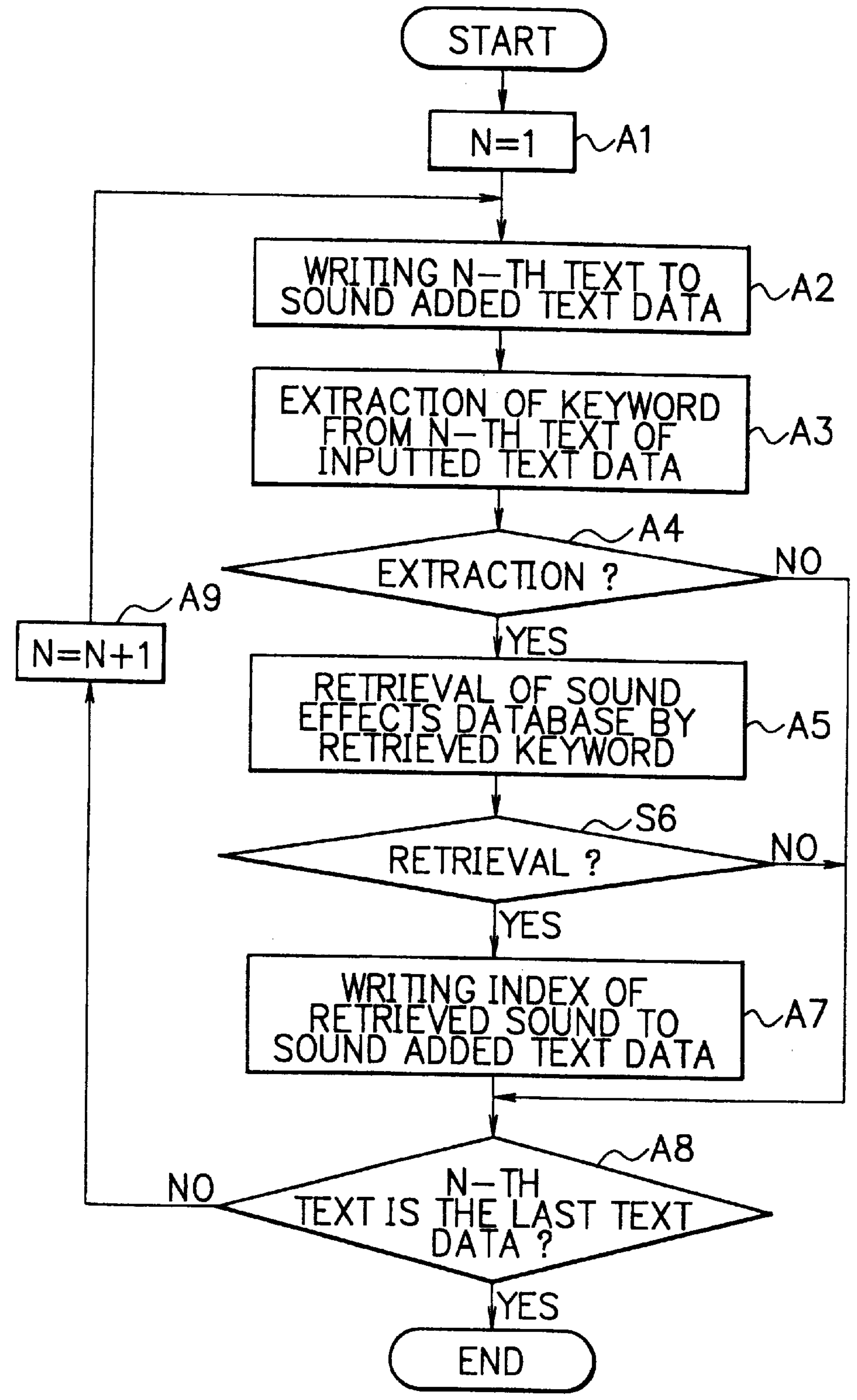
FIG. 5 is a flowchart for explaining operation of sound selection device in the configuration of one enforcement of the sound effects affixing device of the present invention.

FIG. 5 is a flowchart showing operation of the sound selection device 3 in the configuration of the first enforcement of the present invention.

Firstly, there will be described operation of the sound selection device 3 referring to FIGS. 4 and 5.

A variable number N=1 is established as an initial-value to the text acquisition unit 33 (STEP A1).

The text acquisition unit 33 reads N-th text sentences from the text data 11 to write the sound added text table 12 (STEP A2). Simultaneously, the text acquisition unit 33 outputs the N-th sentences to the keyword extraction unit 31.

The keyword extraction unit 31 inputs therein the N-th sentences outputted from the text acquisition unit 33 to extract the keyword (STEP A3, A4).

There will be described concrete operation about the keyword extraction unit 31. The keyword extraction unit 31 is provided with at least one of the onomatopoeia extraction means 311, the sound source extraction means 312, and the subjective words extraction means 313. The onomatopoeia extraction means 311 extracts onomatopoeia as keywords from the inputted text. The sound extraction means 312 extracts names of sound source as keywords from the inputted text. The subjective words extraction means 313 extracts subjective words as keywords from the inputted text. (STEP A3, A4)

Thus the keywords retrieved are inputted to the sound retrieval unit 32. The sound retrieval unit 32 retrieves the sound effects database 2 by the keywords retrieved (at least one of the onomatopoeia, the name of sound source, and the subjective words), thus obtaining sound index consisting of, for instance, file name and so forth as a retrieved result (STEP A5, A6), before writing obtained sound index to the sound added text table 12 while associating with the sentences written beforehand (STEP S7).

Next, when the N-th sentences is the last sentences of the text data 11, the process is terminated, while when the N-th sentences is not the last sentences, the process from STEP A2 is repeated while updating the variation number N (N=N+1) (STEP A8, A9).

In STEP A4 and STEP A6, when there is no result keyword extraction and sound retrieval, the process is shifted from STEP A4 or STEP S6 to STEP A8.

Figure 6:
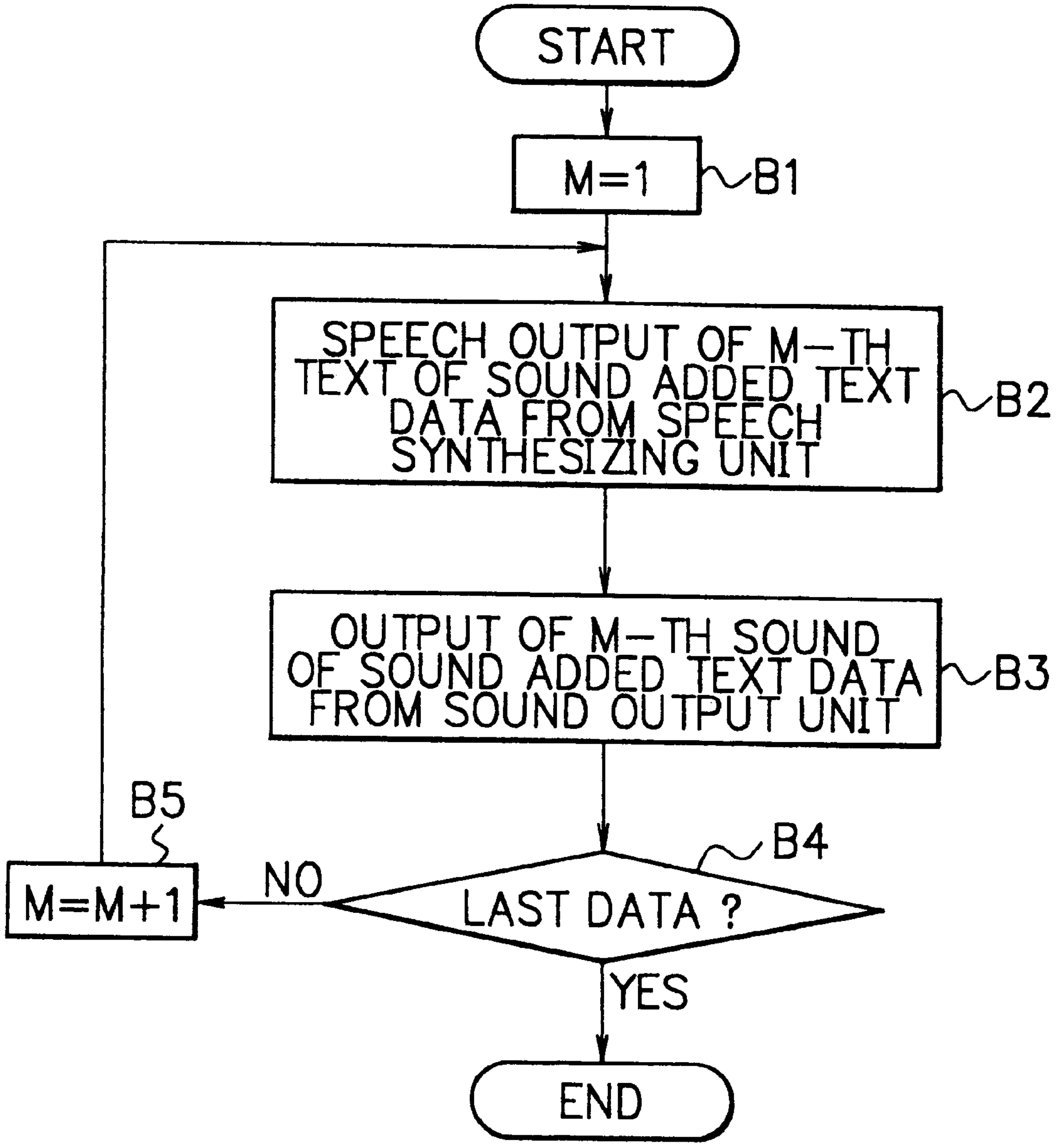
FIG. 6 is a flowchart for explaining operation of output sound control device in the configuration of one enforcement the sound effect attaching device of the present invention.

FIG. 6 is a flowchart showing operation of the output sound control device 4 in the configuration of the first enforcement of the present invention.

Next, there will be described operation of the output sound control device 4 referring to FIGS. 4 and 6.

A variable number M=1 is established to the control unit 41 STEP B1). The control unit 41 reads the M-th text from the sound added text table 12, before giving it to the speech synthesizing unit 42, thus the speech synthesizing unit 42 synthesizes synthesized speech to output as the sound through the sound output device 5 (STEP B2).

At the same time, the control unit 41 reads an index (for instance, name of file) of the sound corresponding to the read M-th text from the sound added text table 12 to give it to the sound effects output unit 43.

The sound effects output unit 43 acquires the sound data corresponding to index of the sound from the sound effects database 13 to output it as the sound through the sound output device 5 (STEP B3).

The control unit 41 checks whether the M-th sentences is the last sentences in the sound added text table 12 (STEP B4), when the M-th sentences is not the last sentences, updating the various number M (M=M+1) (STEP B5), thus repeating the process from STEP B2. In STEP B4, when the M-th sentences is the last sentences, the process is terminated.

In the configuration of the first enforcement of the present invention, the text acquisition unit 33, the keyword extraction unit 31, the sound retrieval unit 32, and the control unit 41 of the output sound control device 4 are capable of being realized regarding the function and/or process by a program executed on a computer, in this case, the present invention is capable of being implemented in such a way that the computer reads to be executed the above program from a prescribed storage medium.

[Embodiment 1]

There will be described the configuration of the first enforcement of the present invention along with further concrete embodiment.

Figure 7:
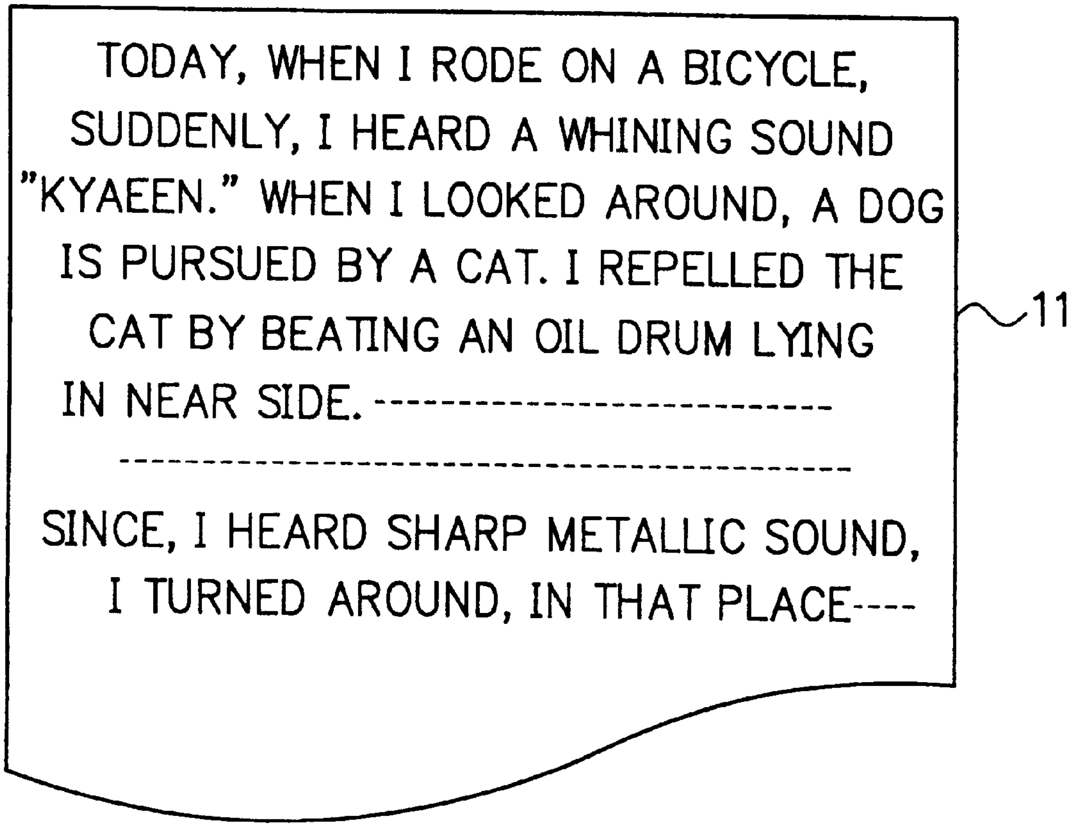
FIG. 7 is a view showing one example of text data for explaining the configuration of one enforcement of the sound effects affixing device of the present invention.

FIG. 7 is a view showing one example of text data for explaining the configuration of one enforcement of the sound effects affixing device and one concrete example of affixed sound effects of the present invention. FIG. 8 is a view showing one concrete example of sound added text table for explaining the configuration of one enforcement of the sound effects affixing device of the present invention. FIG. 9 is a view showing one concrete example of label of sound effects database for explaining the configuration of one enforcement of the sound effects affixing device of the present invention.

There will be described the sound selection device 3 referring to FIGS. 4, 5, 8, and 9.

On the supposition that there is sentences shown in FIG. 7 as a text data 11 which is the sentences of sound effect acquisition object. The text acquisition unit 33 reads "Today, when I rode on a bicycle, suddenly, I heard whining sound "KYAEEN", which is the first (N=1) sentences from the text data 11 to write it to the sound added text table 12 (STEP A1, A2).

FIG. 8 shows one example of content of the sound added text table 12 which has a table structure constituted with sentences number column 121, sentences column 122, and sound index column 123 as one entry.

The sound added text table 12 is suitable if correspondence between the text and the sound data is capable of being described.

In this embodiment, the text acquisition unit 33 writes the first read sentences at the first line of the sentences number of the sentences column 122.

Further, the text acquisition unit 33 inputs the first read sentences to the keyword extraction unit 31.

The keyword extraction unit 31 is provided with at least one of the onomatopoeia extraction means 311, the sound source extraction means 312, and the subjective words extraction means 313. The respective means extract each keyword of the onomatopoeia, the sound source name, and subjective words from inputted sentences (STEP A3 of FIG. 5).

Here, there will be described concrete example in detail of the keyword extraction method (STEP A3) of the keyword extraction unit 31.

It is suitable to extract the onomatopoeia by utilizing well known natural language processing device as the onomatopoeia extraction means 311. However, in this case, some times the process becomes complicated and the process becomes late. As the another method, it is desirable to extract the onomatopoeias from the inputted sentences by utilizing character type matching and keyword matching. Further, It is capable of being thought a way in which words (character type) whose kind of character (the square form of kana; katakana, the cursive form of kana; hiragana in the Japanese language), font, character decoration (bold, italic or so . . . ), size of character are different from basic orthographic section of the sentences are regarded as candidates of the onomatopoeias. Because, the onomatopoeias are often described by the square form of kana (katakana; Japanese language), decorated character (ex. Italic, Bold), or different font.

According to these methods in which the onomatopoeias are extracted by utilizing difference of the character type, a word which is not the onomatopoeia is regarded as the onomatopoeia, so that it is inputted to the sound retrieval unit 32 as the retrieval keyword. However, as a result, possibility that corresponding sound data is not retrieved is extremely high, therefore, this method is desirable method for achieving speed up of the extraction processing of the onomatopoeia. In the present embodiment, this method is utilized.

Here, onomatopoeias may be used as verb, adverb, adjective or noun. Thus, onomatopoeia includes these all kinds of parts of speech. Especially, in English many onomatopoeias are used as verb (for example, bark, yelp, whine, neigh, whinny etc.)

Next, it is also suitable to extract the sound source name while utilizing the well known natural language processing device as the sound source extraction means 312. However, with the natural language processing applied in relation to the whole sentences, the processing becomes complicated, thereby the following method can be thought.

Verbs which represent or be associated with sounding situation (for example, ring, cry, bark, chirp, squeal, beat, knock, tap, hit, flick, break, split and so forth) are registered beforehand in the sound source extraction means 312. The sound source extraction means 312 checks whether these verbs are included in the inputted sentences, thus extracting the pronunciation sound source name while implementing natural language processing in relation to only the unit of sentences which includes at least one of these verbs. In the present embodiment this method is utilized.

Next, it is also suitable to utilize the natural language processing device as the subjective words extraction means 313. However, some another methods are capable of being thought.

As the first method, the keyword which associated with sound such as "sound", "noise", "roar", "echo", "peal", and so forth, are registered beforehand to the subjective words extraction means 313, thus extracting the word modifying these keywords by the natural language processing in relation to only the unit of sentences on which these keywords exist.

Furthermore, as the second method, the keyword which mean sound such as "sound", "noise", "roar", "peal" and so forth, and the subjective words which is utilized for the sake of modification of the sound, for instance, beautiful, magnificent, and so forth are registered beforehand.

When there exists both of the keywords meaning sound and the subjective words modifying the keyword in the inputted one unit of sentences, the subjective words are extracted as the retrieval keyword. In the present embodiment, this method is utilized. For instance, "sound", "noise", "roar", "peal" and so forth, are registered in the subjective words extraction means 313 as the keyword representing sound. Further, as the subjective words, 10 kinds of the subjective words of Annoying, Metallic, Thick, Beautiful, Unsatisfactory, Magnificent, Hard, Cheerful, Dull, and Mild are registered in the subjective words extraction means 313.

Here, there will be described concrete example of operation (STEP A3 of FIG. 5) of the keyword extraction means 31.

The onomatopoeia extraction means 311 extracts "KYAEEN" (;onomatopoeia) to be the Italic form the inputted first sentence that "Today, when I am riding a bicycle, suddenly, a whining sound "KYAEEN" was heard" to input "KYAEEN" to the sound retrieval unit 32.

The sound source extraction means 312 retrieves inputted sentence about the verbs of ring, cry, bark, chirp, squeal, beat, knock, tap, hit, flick, break, split which are registered beforehand, however, since there does not exist the verbs in the inputted sentence, the process is terminated.

The subjective words extraction means 313 retrieves the inputted sentence about the word of "noisy", "metallic" or so forth registered beforehand, however, since there does not exist the words in the inputted sentence, the process is terminated (STEP A3, A4).

Next, the sound retrieval unit 32 retrieves the sound effects database 2 according to the inputted keyword KYAEEN (;onomatopoeias) (STEP 5).

Here, the sound effects database 2 and the sound retrieval unit 32 are described in "An Intuitive Retrieval and Editing System for Sound Data" by Sanae Wake and Toshiyuki Asahi, Information Processing Society, Report by Information Media Research Association, 29-2, pp. 7 to 12. (January, 1997). In this connection, the sound data itself and the label in relation to the respective sound data are accumulated as the sound effects database indicated in the literature.

FIG. 9 shows one example of the label. The label maintains two kinds of keywords of the onomatopoeias and the sound source names regarding each sound, and the point obtained in connection with the subjective words, which is established beforehand. The subjective words are words which are utilized for describing the sound (for instance, gentle, or calm). The point obtained in connection with the subjective words, namely, point for subjective words is a numeral value representing what rate is conscious of the subjective words (for instance, gentle) while hearing the sound.

Further, the sound retrieval unit indicated in the above-described literature retrieves the sound effects database according to the three kinds of keywords of the onomatopoeias, the sound source names, and the subjective words. With respect to the sound source names, there is utilized the retrieval according to keyword matching method. With respect to the onomatopoeias, the method disclosed in the Japanese Patent Application Laid-Open No. HEI 10-149365 "Sound Retrieval System Using Onomatopoeias and Sound Retrieval Method Using the Same" is used, thus it is capable of being implemented the retrieval for the similar onomatopoeias by assessing degree of resemblance between two onomatopoeias as well as the complete matching of keywords. Thus this method is capable of coping with variation of the onomatopoeias.

With respect of the subjective words, when any of the subjective words established beforehand is inputted as the retrieval keyword, the sound data whose subjective words point is high is outputted as retrieval result.

According to this method, the sound retrieval unit 32 retrieves the sound effects database 2 using the keyword "KYAEEN", thus obtaining the sound file of "dog. wav" as the retrieval result (STEP A5, A6 of FIG. 5). Here, ".wav" is an extension which indicates that this file is a sound data which is capable of being managed in the computer. In this case, as an example, file of ".wav" type (.wav type) is mentioned here. However, it is capable of being used any of sound file type or any of sound file format if only sound data which is capable of being managed in the computer.

Next, the sound retrieval unit 32 enters the sound index (file name) of the retrieval result in the sound index column 123 in the first line of the sentence number of the sound added text table 12 (STEP A7 of FIG. 5).

Next, the text acquisition unit 33 checks whether the first sentence treated now is the last sentence (STEP A8). In this case, since there is next sentence, returning to STEP A2 with N as N=N+1 (thus in this case N=2) (STEP S9).

When the processing for the first (N=1) sentence is terminated, the text acquisition unit 33 reads second sentence (N=2) that is "When I looked around, a dog is pursued by cat" (referring to FIG. 7), then write this into the sound added text table 122 (referring to FIG. 8) (STEP A2 of FIG. 5).

Further, the text acquisition unit 33 provides the sentence to the onomatopoeias extraction means 311, the sound source extraction means 312, and the subjective words extraction means 313. The respective means 311, 312, and 313 process to extract the keywords of onomatopoeias, sound source names, and subjective words from the sentence provided from the text acquisition unit 33 (STEP A3). However, any keywords does not exist in this sentence (STEP A4).

The text acquisition unit 33 checks whether the second sentences the last sentence of the text data 11 (STEP A9 of FIG. 5), with the result that since the second sentence is not the last sentence, returning to STEP A2 with N as N=N+1 (thus in this case N=3) (STEP A8).

Similarly, the keyword extraction processing is implemented in relation to the third sentence that "I repelled the cat by beating an oil drum lying in near side". The sound source extraction means 312 retrieves the registered verb (and their conjugation form) in the inputted sentence, and gets the word "beating" which is a conjugation form of the verb "beat". Thus the keyword "an oil drum" which is an object of the verb "beating" is obtained using the natural language processing. The sound source extraction means 312 inputs this keyword to the sound retrieval unit 32.

While, the onomatopoeias extraction means 311 and the subjective words extraction means 313 retrieve the inputted sentence with respective method, however since there does not exist any keywords in the sentence, thus the processing is terminated (STEP A3, A4 of FIG. 5).

The sound retrieval unit 32 retrieves the sound effects database 2 by the keyword "an oil drum", as a result, obtaining [can. wav] (".wav" is extension which indicates sound file) to write in the sound added text table 12 (STEP A5, A6, A7 of FIG. 5, FIG. 8).

Similarly, when the subjective words extraction means 313 implements retrieval in relation to the inputted sentence concerning the N-th sentence of "Since I heard sharp metallic sound, I turned around, in that place . . . ", since there exists the subjective word "metallic" and the word "sound", the subjective word "metallic" is inputted to the sound retrieval unit 32 as the retrieval keyword.

As a result thereof, the sound of index "effect1. wab" is retrieved to be registered in the sound added text table 12.

Thus, the sound effects selection processing according to the sound selection device 3 is implemented in relation to the whole sentences to the text data 11, and, the sound added text data 12 in which correspondence between text sentences and the sound effects are described is completed.

Next, there will be described the output sound control device 4 referring to FIGS. 4, 6, and 8.

In the control unit 41, a variable number M is initialized (M=1) (STEP B1 of FIG. 6).

When the control unit 41 reads the sentence from the M-th sentence column 122 of the sentence number of the sound added text table 12 (FIG. 8) to input to the speech synthesizing unit 42, the speech synthesizing unit 42 generates the synthesized speech to output from the sound output device 5 (STEP B2).

The control unit 41 reads the sound index from the M-th sound index column 123, while the synthesized speech is outputting. When the sound index is inputted to the sound effects output unit 43, the sound effect output unit 43, the sound effect output unit 43 retrieves corresponding sound effects data from the sound effects database 2, thus outputting the sound effects through the sound output device 5.

As modification of this embodiment, the detailed information is registered to the sound added text table 12 in such a way that the sound is retrieved from what keyword of what sentence and so forth. Thereby, when the keyword is just outputted by synthesized speech, it is capable of being outputted the sound effects, further, it is capable of being reproduced the sound effects to the part of the keyword instead of reading the onomatopoeia by synthesized speech.

[Configuration of Enforcement 2]

Figure 10:
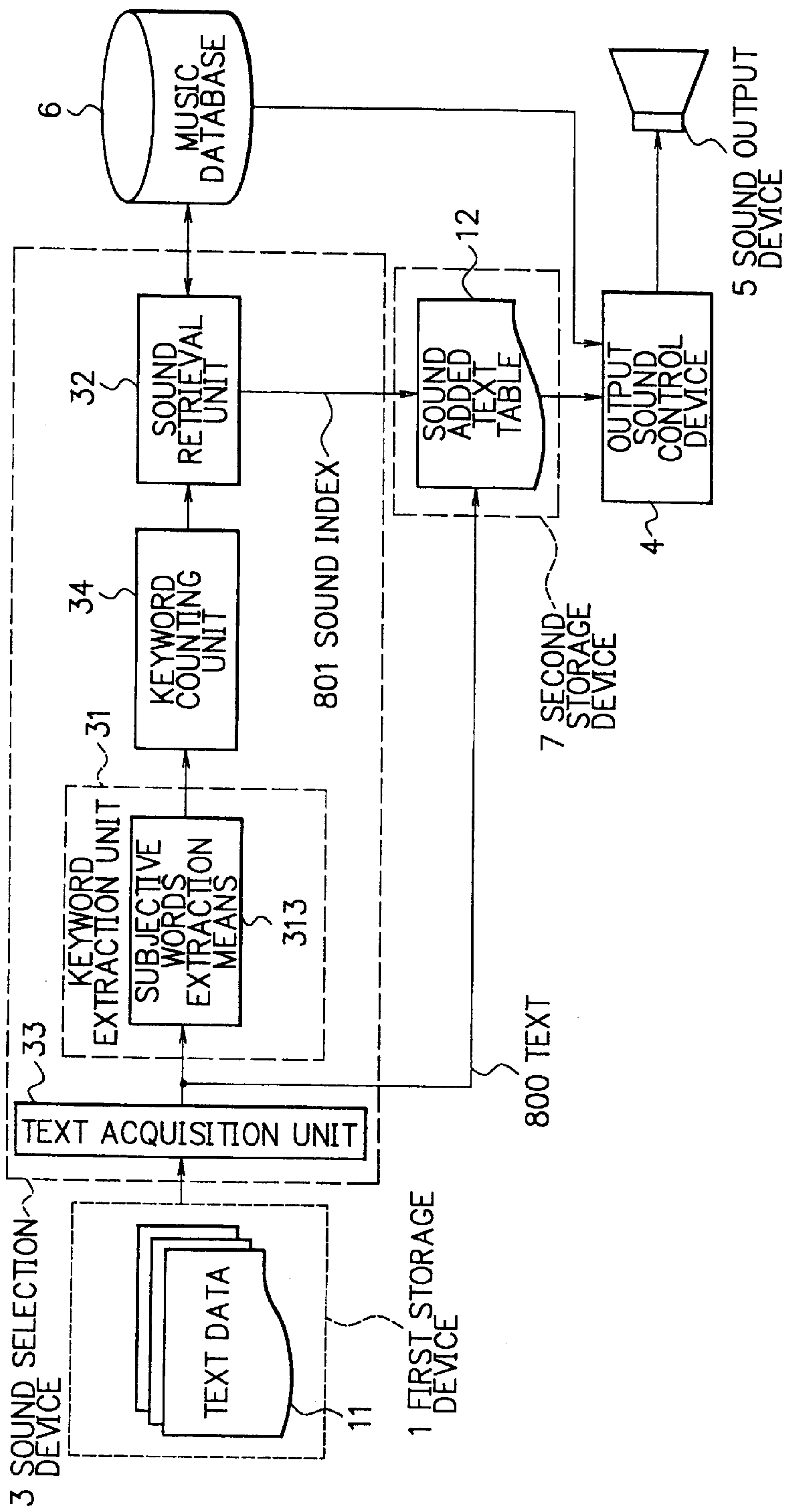
FIG. 10 is a view showing a constitution of the configuration of one enforcement of the background music affixing device of the present invention.

Next, there will be described the second configuration of the enforcement of the present invention. The second configuration of the enforcement is a device for affixing music as background music for reading aloud sentence. FIG. 10 shows a constitution of the second configuration of the enforcement.

Referring to FIG. 10, the second configuration of the enforcement is provided with a first storage device 1 for preserving text data, a second storage device 7, a music database 6, and a sound selection device 3 for selecting music from the music database. Further, the second configuration of the enforcement is provided with the output sound control device 4 and the sound output device 5 utilized in the first configuration of the enforcement as the constitution of the output system in the second configuration of the enforcement of the present invention, and these devices have the same constitution as those of the first configuration of the enforcement.

The first storage device 1 stores therein the text data 11 to be an object of music affixing. The second storage device 7 stores therein the sound added text table 12 in which information of the selected sound effects associated with the text is stored.

The music database 6 accumulates various music data (for instance, PCM format data, MIDI format data, and so forth) and label in relation to these music data. In these labels, at least the subjective words representing impression of the music are described as the keyword.

The sound selection device 3 is provided with the text acquisition unit 33, the keyword extraction unit 31, the keyword counting unit 34, and the sound retrieval unit 32.

The text acquisition unit 33 reads the sentences in every certain unit (for instance, a paragraph, a sentence, a passage) from the text data 11, thus writing the read sentences to the sound added text table 12. Further the text acquisition unit 33 provides the sentences to the keyword extraction unit 31.

The keyword extraction unit 31 consists of the subjective words extraction means 313, thus the subjective words extraction means 313 retrieves the subjective words (for instance, beautiful, magnificent, and so forth) from the sentences inputted to output to the keyword counting unit 34.

The keyword counting unit 34 inputs therein the subjective words outputted from the keyword extraction unit 31 to count the number of each subjective word.

Further, the keyword counting unit 34 maintains threshold value determined beforehand in relation to respective subjective words. When the count number of a subjective word exceeds the threshold value, the subjective word is outputted to the sound retrieval unit 32.

The sound retrieval unit 32 retrieves the music database 6 by the subjective word outputted from the keyword counting unit 34 to get the result that is the music according to the subjective word. Thus the index of retrieval result (for instance file name) is stored in the sound added text table 12. At this time, the index of the retrieval result is stored in the sound added text table 12, associating with the sentences to be object of music affixing.

Figure 11:
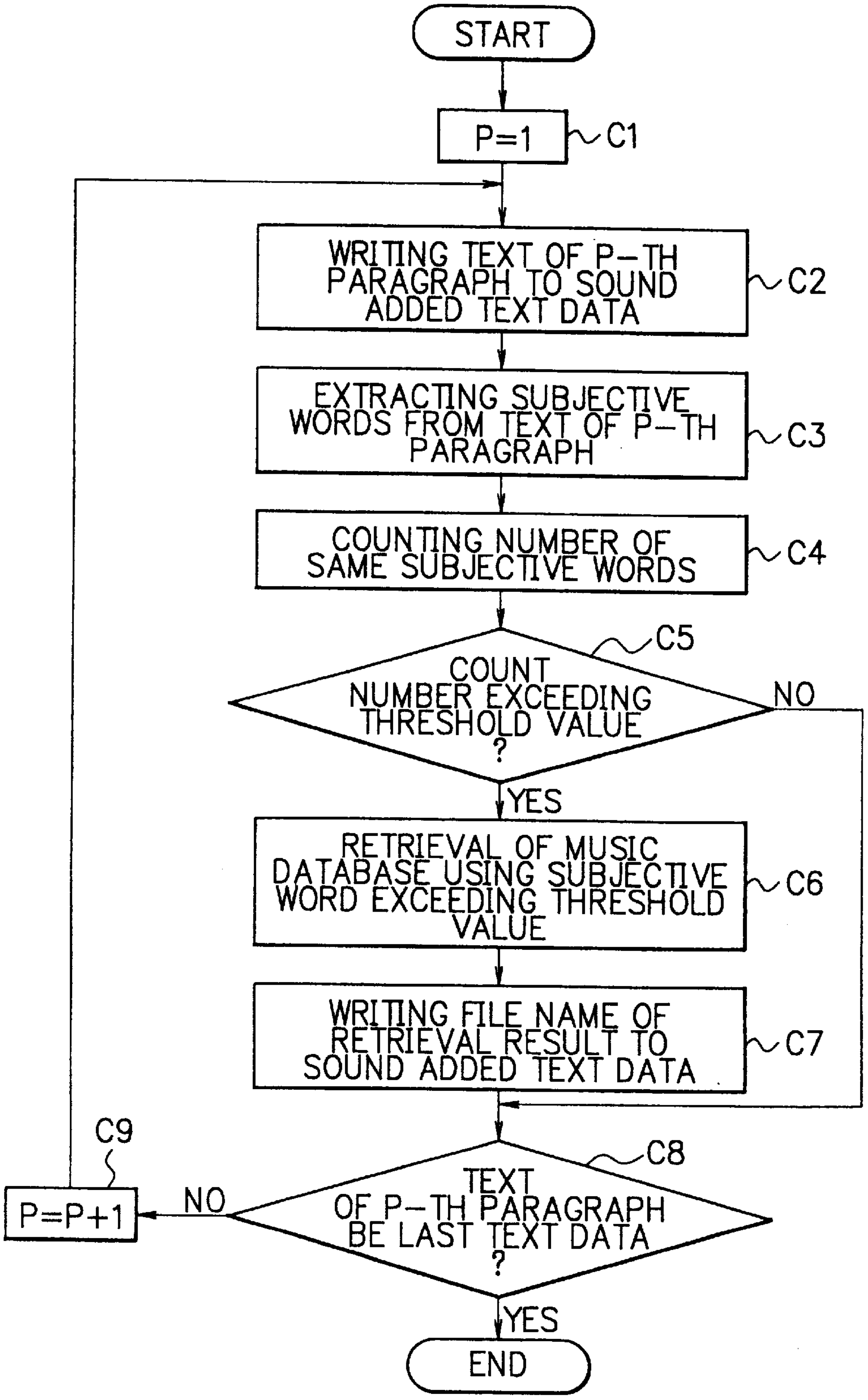
FIG. 11 is a flowchart for explaining operation of sound selection device of one configuration of the background music affixing device of the present invention.

FIG. 11 is a flowchart showing operation of the second configuration of the enforcement of the present invention. There will be described operation of the second configuration of the enforcement of the present invention referring to FIGS. 10 and 11.

Firstly, a variable number P=1 is established to the text acquisition unit 33 (STEP C1).

The text acquisition unit 33 reads P-th paragraph (at first time the text acquisition unit 33 reads the first paragraph) from the text data 11 to store in the sound added text table 12 (STEP C2). Simultaneously, the text acquisition unit 33 outputs the P-th paragraph to the subjective words extraction means 313.

The subjective words extraction means retrieves the subjective words from the P-th paragraph inputted from the text acquisition unit 33 (STEP C3).

The subjective words extracted at the subjective words extraction means 313 is outputted to the keyword counting unit 34, and the keyword counting unit 34 counts appearance number of each subjective words (STEP C4), when the number exceeds the threshold value registered beforehand (STEP C5), the subjective word is outputted to the sound retrieval unit 32. The sound retrieval unit 32 retrieves the music database 6 according to the subjective words inputted from the keyword counting unit 34, thus obtaining the sound index, for instance file name, as the retrieval result.

Next, the sound retrieval unit 32 writes the obtained sound index to the sound added text table 12, associated with the P-th paragraph written beforehand (STEP C7).

When the sentences of the P-th paragraph is not the last paragraph of the text data 11, the processing from STEP A2 is repeated with P as P=P+1 (STEP C8, C9).

At this time, the counter number of the keyword counting unit 34 is cleared to zero.

When any keyword number did not exceed the threshold value in STEP C5, the processing shifts from STEP C5 to STEP C8.

[Embodiment 2]

Figure 12:
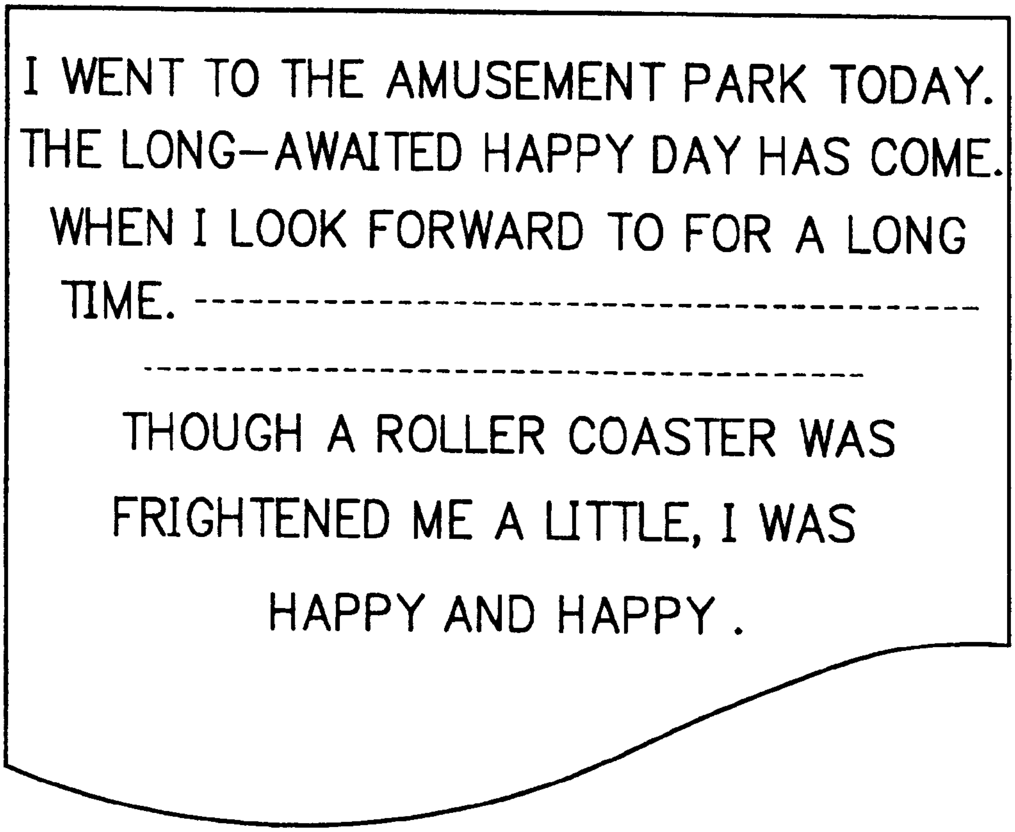
FIG. 12 is a view showing an another example of a text data for explaining the configuration of one enforcement of the background music affixing device of the present invention.

There will be described the second configuration of the enforcement of the above-mentioned present invention in accordance with the concrete embodiment. FIG. 12 is a view showing one example of the text data in the embodiment of the second configuration of the enforcement of the present invention. There will be described in detail the second configuration of the enforcement of the present invention.

The sentences shown in FIG. 12, for instance, is stored in the first storage device 1 as the text data 11 to be the sentences of music affixing object.

An initial value P=1 is established to the text acquisition unit 33 (STEP C1). The text acquisition unit 33 reads the P-th (P=1) paragraph of "I went to the amusement park today. The long-awaited happy day has come . . . Though a roller coaster frightened a little, Today I was very happy and happy ." (referring to FIG. 12) from the text data 11, and write the paragraph to the sound added text table 12 (STEP C2), simultaneously, input the paragraph to the subjective words extraction means 313.

The subjective words such as "happy", "sad", "violent", "frightening", "doubtful", and so forth are registered in the subjective words extraction means 313, thus extracting these subjective words and their inflection forms from the inputted paragraph.

When the subjective words extraction means 313 checks the inputted sentences of "I went to the amusement park today. The long-awaited happy day has come . . . Though a roller coaster frightened a little, Today I was very happy and happy ." the subjective words of "happy" and "frightened" are detected (STEP C3), and inputted to the keyword counting unit 34.

When the keyword counting unit 34 counts the number of the inputted keywords, the result is obtained that there are three of the "happy" and one of the inflection form "frightening" (STEP C4).

Here, it is supposed that the numeral value of the threshold value "2" in relation to the whole keywords. It is also possible to establish for each subject word.

The keyword counting unit 34 outputs the subjective words whose appearance number exceeds the threshold value to the sound retrieval unit 32. In the case of this example, since only the subjective word of "happy" exceeds the threshold value (=2), "happy" is outputted to the sound retrieval unit 32 as a keyword (STEP C5, C6).

The sound retrieval unit 32 retrieves the music database 6 by the keyword "happy" to obtain the index (file name) of the music data.

The sound retrieval unit 32 writes the obtained music file name to the sound added text table 12 in such a way that the obtained music file name is associated with the text data written previously (STEP C7).

The text acquisition unit 33 checks whether the P-th paragraph is the last paragraph of the text data 11 (STEP C8), when the P-th paragraph is not the last paragraph, the text acquisition unit 33 causes the process to be returned to STEP C2 with P as P=P+1. When the P-th paragraph is the last paragraph, the process is terminated.

When plural subjective words exceed the threshold value at the keyword counting unit 34, the subjective word whose count number is the most number is capable of being taken as the keyword for retrieval.

Further, when there are plural subjective words whose count numbers are the most number, it is capable of taking any of the following methods to cope with.

The first method is that the subjective word other than the subjective word selected in one preceding paragraph is selected as a retrieval keyword. The second method is that the paragraph is divided into a front half and a rear half, then counting again the subjective words in each of the front half and the rear half of the paragraph. Thus, different background music is affixed to the front half of the paragraph and the rear half of the paragraph. The third method is that plural subjective word label of the music database 6 are registered beforehand, thus implementing retrieval according to a combination of the subjective words.

The second configuration of the enforcement of the present invention described-above retrieves the subjective words from the text sentences which is music affixing object, when the appearance number of a subjective word exceeds the fixed number, it is capable of outputting the music associated with the subjective word as the background music while the sentences is read aloud.

Using this method, it is capable of affixing the background music which is reflected the feeling of author or a character of the sentences. Further, it is capable of affixing the background music with simple processing, without using the natural language processing to the whole sentences.

On the other hand, in the second configuration of the enforcement of the present invention, it is also suitable that the keyword extraction unit 33 is provided with an environment extraction unit of the information processing device described in the Japanese Patent Application Laid-open No. HEI 7-72888. At this time, the information processing device is directly connected with the sound retrieval unit 33. The environment extraction unit is capable of specifying the place appears in the sentences. If it is understood that the place of the scene is "sea" by the environment extraction unit 1050, it is capable of being retrieved the music database 6 by the keyword "sea".

Using this method above, it is capable of being outputted the background music which is fit for the environment of the scene.

Further, for both of the first and the second configurations of the enforcement, it is suitable to separate the sound selection device 3 and the sound control device 4. When the sound selection device 3 and the sound control device 4 are separated and connected by the communication network, users can obtain the same effect as that of the configuration of the enforcement described above, without sound effect database 2 (or music database 6) at the side of the user (client side). The sound effects database 2 (or the music database 6) is established at the side of server machine. In such the constitution, the client system for the user is simple, thus it becomes possible to design the user's system cheaply.

Furthermore, by managing the database at the server side, management of updating the data and copyrighting the data becomes easier.

As the concrete embodiment, when the sentences are exchanged between two parties such as electrical mail, there is provided the sound selection device 3 and the sound effect database 2 (or the music database 6) at the transmission side of the sentences, while there is provided the output sound control device 4 and the sound effects database 2 (music database 6) at the reception side. The transmission side implements the keyword selection beforehand, before transmitting the sound added text table 12 to the receiver. The reception side is capable of hearing the sound added text table 12 while utilizing the output sound control device 4.

Moreover, according to transmission method of transmitting the sound added text table 12 with necessary sound data, the reception side is capable of hearing the speech with sound effects and/or music if there is the output sound control device 4 even though there is no the sound effects database 2, or no the music database 6.

On the other hand, about both of the first and the second configurations of the enforcement described above, it is capable of being implemented real time processing of sound effect affixing (background music affixing).

In this case, condition is that processing speed of the sound selection device 3 is sufficiently high speed. So while the sentences are outputted from the sound output device 5, the sound selection device 3 implements sound affixing processing for next sentences (or paragraph).

Thus when the real time processing is implemented, it is possible not to utilize the sound added text table 12. In this case, the sentences 800 (FIG. 4) and the sound index 801 retrieved by the sound retrieval unit 32 are inputted directly to the control unit 41 of the output sound control device 4 without utilizing sound added text table 12. The control unit 41 implements the output while synchronizing the speech with the sound effects (or music).

Further, it is capable of being utilized the device having sight information output function such as a display and so forth in addition to output of the sound information as the sound output device 5. For the sake of this constitution, it is capable of realizing that the sound is outputted while indicating the sentences on the display.

Furthermore, when sentences are indicated by character string on a display device, it can be designed to indicate sound keywords as selectable (clickable) character strings. This method enables users to listen to the sound effects (music) when users click the sound keywords (onomatopoeias, sound source names or subject words) appeared in the sentences.

According to the present invention following effect is brought.

The first effect of the present invention is that the sentences analyzing processing in order to affix the sound effects in relation to the sentences becomes easy, with the result that it is capable of being reduced processing time of sound effect retrieval to sound effect affixing.

This is because that the present invention pays attention only to the onomatopoeias, the sound source names, and the subjective words which appears in the sentences to acquire the keyword for sound retrieval.

The second effect of the present invention is that it is capable of being affixed the faithful sound effects to the sound representation within the text document.

This is because that the invention implements retrieval according to the onomatopoeias by acquiring the onomatopoeias within the sentences, which represents sound the most concretely.

The third effect of the present invention is that it is capable of being selected automatically the background music which is agreed with the inclination of the sentences with simple processing and short processing time.

This is because the invention retrieves music using appearance number of the subjective word in the sentences.

While preferred embodiments of the invention have been described using specific terms, such description is for illustrative purpose only, and it is to be understood that changes and variations may be made without departing from the spirit or scope of the following claims.

What is claimed is:

1. A sound effects affixing method comprising the steps of:

(a) a step for acquiring a sentences in every prescribed unit from inputted text data;

(b) a step for extracting at least one kind of onomatopoeias, sound source names, and subjective words within said sentences;

(c) a step for retrieving corresponding sound effects from sound database with any of extracted the onomatopoeias, the sound source names, and the subjective words; and (d) a step for outputting synthesized speech for reading said sentences synchronized with retrieved sound effects corresponding to one of the onomatopoeias, the sound source names, and the subjective words.

2. A sound effects affixing method as claimed in claim 1, wherein said prescribed unit is any of a passage, a sentence, or a paragraph.

3. A sound effects affixing device comprising:

a text acquisition means for acquiring sentences in every prescribed unit from an inputted text data;

an onomatopoeias extraction means for extracting onomatopoeias within said sentences while inputting said sentences acquired by said text acquisition means;

a sound retrieval means for retrieving a sound database using said onomatopoeias extracted by said onomatopoeias extraction means; and an output sound control means for outputting synthesized speech for reading said sentences from said text acquisition means synchronized with sound effects corresponding to said onomatopoeias retrieved by said sound retrieval means.

4. A sound effects affixing device as claimed in claim 3, wherein said onomatopoeias extraction means extracts "katakana": the square form of kana existing in said sentences as a candidate of said onomatopoeias.

5. A sound effects affixing device as claimed in claim 4, wherein sound effects data and at least one kind of keyword of onomatopoeias, sound source names, or subjective words as information labels concerning each sound effect data are registered in the sound database.

6. A sound effects affixing device as claimed in claim 3, wherein said prescribed unit acquired from the text data by the text acquisition means is any of a phrase, a sentence, or a paragraph.

7. A sound effects affixing device as claimed in claim 6, wherein sound effects data and at least one kind of keyword of onomatopoeias, sound source names, or subjective words as information labels concerning each sound effect data are registered in the sound database.

8. A sound effects affixing device as claimed in claim 3, wherein sound effects data and at least one kind of keyword of onomatopoeias, sound source names, or subjective words as information labels concerning each sound effect data are registered in the sound database.

9. A sound effects affixing device comprising:

a text acquisition means for acquiring sentences in every prescribed unit from an inputted text data;

a sound source extraction means for extracting sound source names within said sentences while inputting said sentences acquired by said text acquisition means;

a sound retrieval means for retrieving a sound database using said sound source names extracted by said sound source extraction means; and an output sound control means for outputting synthesized speech for reading said sentences from said text acquisition means synchronized with sound effects corresponding to said sound source names retrieved by said sound retrieval means.

10. A sound effects affixing device as claimed in claim 9, wherein sound effects data and at least one kind of keyword of onomatopoeias, sound source names, or subjective words as information labels concerning each sound effect data are registered in the sound database.

11. A sound effects affixing device as claimed in claim 9, wherein said prescribed unit acquired from the text data by the text acquisition means is any of a phrase, a sentence, or a paragraph.

12. A sound effects affixing device as claimed in claim 9, wherein the sound source extraction means extract the sentences which includes verbs concerning sound registered beforehand is extracted, before implementing natural language processing in relation to said sentences to extract sound source names.

13. A sound effects affixing device as claimed in claim 12, wherein sound effects data and at least one kind of keyword of onomatopoeias, sound source names, or subjective words as information labels concerning each sound effect data are registered in the sound database.

14. A sound effects affixing device comprising:

a text acquisition means for acquiring sentences in every prescribed unit from an inputted text data;

a subjective words extraction means for extracting subjective words in said sentences while inputting said sentences acquired by said text acquisition means;

a sound retrieval means for retrieving a sound database using said subjective words extracted by said subjective words extraction means; and an output sound control means for outputting synthesized speech for reading said inputted sentences synchronized with sound effects corresponding to said subjective words retrieved by said sound retrieval means.

15. A sound effect affixing device as claimed in claim 14, wherein the subjective words are extracted from the sentences which includes both of the subjective words registered beforehand and nouns representing sound registered beforehand.

16. A sound effects affixing device as claimed in claim 15, wherein sound effects data and at least one kind of keyword of onomatopoeias, sound source names, or subjective words as information labels concerning each sound effect data are registered in the sound database.

17. A sound effects affixing device as claimed in claim 14, wherein said prescribed unit acquired from the text data by the text acquisition means is any of a phrase, a sentence, or a paragraph.

18. A sound effects affixing device as claimed in claim 14, wherein sound effects data and at least one kind of keyword of onomatopoeias, sound source names, or subjective words as information labels concerning each sound effect data are registered in the sound database.

19. A background music affixing device comprising:

a text acquisition means for acquiring sentences in every prescribed unit from an inputted text data;

a subjective words extraction means for extracting subjective words in said sentences while inputting said sentences acquired by said text acquisition means;

keyword counting means for counting number of each subjective words extracted by said subjective words extraction means;

a sound retrieval means for retrieving a music database using subjective words outputted from said keyword counting means; and an output sound control means for outputting synthesized speech for reading said sentences from said text acquisition means synchronized with music corresponding to said subjective words retrieved by said sound retrieval means.

20. A background music affixing device as claimed in claim 19, wherein said prescribed unit acquired from the text data by the text acquisition means is any of a phrase, a sentence, or a paragraph.

21. A sound effects affixing device as claimed in claim 19, wherein sound effects data and at least one kind of keyword of onomatopoeias, sound source names, or subjective words as information labels concerning each sound effect data are registered in the sound database.

22. A background music affixing device as claimed in claim 19, wherein the number of the same keyword of inputted keywords is counted, thus a keyword whose count number exceeds a threshold value established beforehand is outputted.

23. A storage medium stored therein a program in order to realize sound effects affixing function by executing following respective processing by a computer, said program comprising processing of:

(a) processing for acquiring a sentences in every prescribed unit from inputted text data;

(b) processing for extracting at least one kind in onomatopoeias, sound source names, and subjective words within said sentences;

(c) processing for retrieving corresponding sound effects from sound database with any of extracted the onomatopoeias, the sound source names, and the subjective words; and (d) processing for outputting synthesized speech for reading said sentences synchronized with retrieved sound effects corresponding to one of the onomatopoeias, the sound source names, and the subjective words.

24. A sound effect affixing device comprising:

(a) a first storage means for maintaining a text data to be an object of sound effects affixing;

(b) a second storage means having sound added text table for storing to be maintained information of selected sound effects associated with sentences;

(c) a sound effects database to which at least one kind of keyword of onomatopoeias, sound source names, and subjective words is registered as sound effects data and information label concerning said data;

(d) a text acquisition means for copying acquired sentences to said sound added text table while acquiring sentences in every prescribed unit such as passage, sentence, paragraph and so forth from text data stored in said first storage means, said sound effects affixing device further comprising:

a keyword extraction means provided with at least one means of (e-1) a onomatopoeias extraction means for extracting the onomatopoeias while inputting acquired sentences by said text acquisition means;

(e-2) a sound source extraction means for extracting sound source names from the sentences which is relevant to the sound, while inputting the acquired sentences by said text acquisition means;

(e-3) a subjective words extraction means for extracting the subjective words from said sentences while inputting the acquired sentences by said text acquisition means, said sound effects affixing device further comprising:

(f) a sound retrieval means retrieving sound effects database with at least one kind of the onomatopoeias, the sound source names, and the subjective words from said keyword extraction means as a keyword, thus writing index information of the sound of the retrieval result into said sound added text table associated with the sentences and words and phrases to be objects of sound effects affixing, said sound effects affixing device further comprising:

an output sound control means provided with:

(g-1) a speech synthesizing means;

(g-2) a control means acquiring sentences in every prescribed unit from said sound added text table, before supplying for said speech synthesizing means, thus acquiring index of the sound corresponding to the sentences of the prescribed unit from said sound added text table;

(g-3) a sound effects output means inputting index acquired by said control mean to retrieve sound file of said index from said sound effects data base, thus acquiring sound effects data; and (h) a sound output means, wherein said sound output means outputs synthesized speech outputted from said speech synthesizing means of said output sound control means synchronized with the sound effects data outputted from said sound effects output means.

* * * * *